(12) United States Patent
Fausak et al.

(10) Patent No.: US 10,044,788 B2
(45) Date of Patent: Aug. 7, 2018

(54) NATIVE CLIENT MULTIMEDIA REDIRECTION

(71) Applicant: Wyse Technology, L.L.C., San Jose, CA (US)

(72) Inventors: Andrew Fausak, San Jose, CA (US); Oleg Rombakh, Los Gatos, CA (US)

(73) Assignee: Wyse Technology L.L.C., San Jose, CA (US)

( * ) Notice: Subject to any disclaimer, the term of this patent is extended or adjusted under 35 U.S.C. 154(b) by 401 days.

(21) Appl. No.: 14/944,045

(22) Filed: Nov. 17, 2015

(65) Prior Publication Data
US 2017/0142184 A1     May 18, 2017

(51) Int. Cl.
| | |
|---|---|
| *G06F 15/16* | (2006.01) |
| *H04L 29/08* | (2006.01) |
| *H04L 29/06* | (2006.01) |

(52) U.S. Cl.
CPC ............ *H04L 67/025* (2013.01); *H04L 65/60* (2013.01); *H04L 67/1002* (2013.01); *H04L 67/42* (2013.01)

(58) Field of Classification Search
CPC ... H04L 67/025; H04L 65/60; H04L 67/1002; H04L 67/42
USPC ........................................................ 709/219
See application file for complete search history.

(56) References Cited

U.S. PATENT DOCUMENTS

| | | | | |
|---|---|---|---|---|
| 7,394,779 B2* | 7/2008 | Seo | ..................... | H04B 7/18584 370/316 |
| 8,793,331 B2* | 7/2014 | Barreto | ............. | G06F 17/30899 709/203 |
| 9,219,729 B2* | 12/2015 | Drope | ............... | G06F 17/30017 |
| 2008/0104647 A1* | 5/2008 | Hannuksela | ..... | H04N 21/23432 725/114 |
| 2009/0010426 A1* | 1/2009 | Redmond | ......... | H04L 29/06027 380/29 |
| 2009/0183171 A1* | 7/2009 | Isaacs | ..................... | G06F 9/468 719/311 |
| 2009/0183227 A1* | 7/2009 | Isaacs | ..................... | G06F 9/468 726/1 |
| 2009/0271707 A1* | 10/2009 | Lin | ................... | G06F 17/30893 715/738 |
| 2009/0287772 A1* | 11/2009 | Stone | ...................... | G06F 9/547 709/203 |
| 2009/0287832 A1* | 11/2009 | Liang | .................... | G06F 3/1446 709/228 |
| 2009/0318235 A1* | 12/2009 | Ashida | .................... | A63F 13/12 463/42 |
| 2010/0138744 A1* | 6/2010 | Kamay | ................... | G06F 9/452 715/716 |

(Continued)

*Primary Examiner* — Razu A Miah
(74) *Attorney, Agent, or Firm* — Kirton McConkie; Brian Tucker

(57) ABSTRACT

A Native Client-based remote display client can efficiently perform multimedia redirection by routing un-rendered multimedia content to browser code executing outside the sandbox in which the remote display client is executed. In this way, a remote display client implemented as a Native Client module will not be limited to using the APIs available within the sandbox to render the multimedia content. The Native Client module can communicate with the browser code to provide parameters necessary for the browser code to submit a web-based request to the Native Client module via localhost to thereby obtain the multimedia content via one or more web-based communications.

20 Claims, 7 Drawing Sheets

(56) References Cited

U.S. PATENT DOCUMENTS

| | | | |
|---|---|---|---|
| 2010/0235820 A1* | 9/2010 | Khouzam | H04N 21/4143 717/148 |
| 2013/0246944 A1* | 9/2013 | Pandiyan | G06F 9/54 715/760 |
| 2013/0275612 A1* | 10/2013 | Voss | H04L 65/60 709/231 |
| 2014/0082052 A1* | 3/2014 | Kwon | H04L 67/08 709/203 |
| 2014/0297720 A1* | 10/2014 | Lim | H04L 29/06047 709/203 |
| 2014/0310344 A1* | 10/2014 | Venkatesh | H04L 67/42 709/203 |
| 2014/0344332 A1* | 11/2014 | Giebler | H04L 67/2823 709/203 |
| 2015/0121252 A1* | 4/2015 | Yerli | H04L 65/4069 715/753 |
| 2015/0264149 A1* | 9/2015 | Guo | H04L 65/4069 709/203 |
| 2016/0173555 A1* | 6/2016 | Papa | H04L 67/2842 709/212 |

* cited by examiner

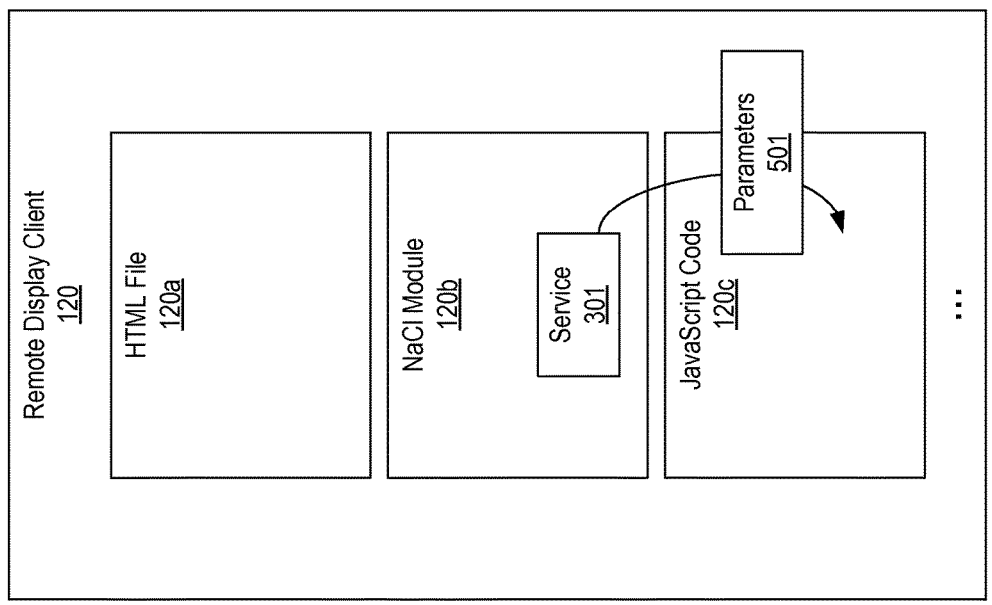

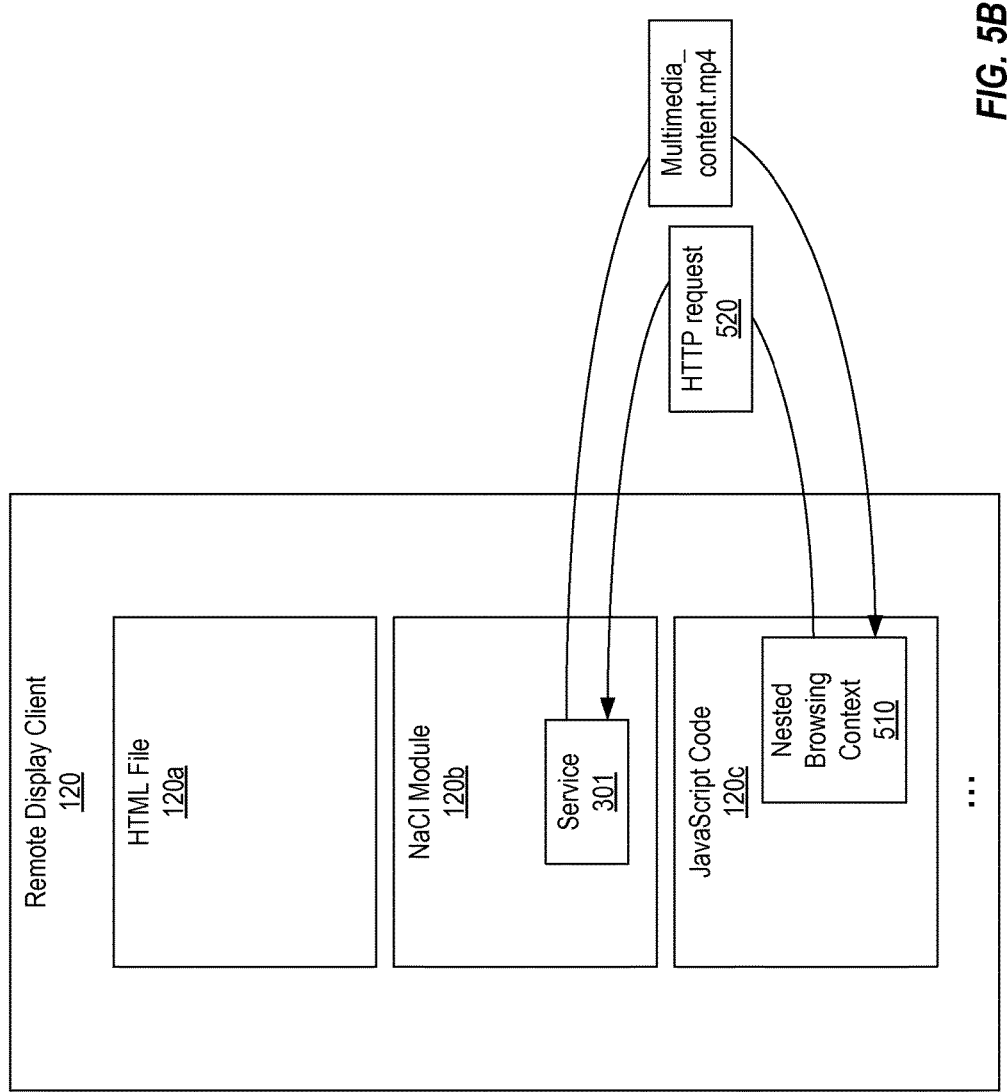

NATIVE CLIENT MULTIMEDIA REDIRECTION

CROSS-REFERENCE TO RELATED APPLICATIONS

N/A

BACKGROUND

Multimedia redirection is a remote access technique that allows multimedia content to be transferred in its raw format from the server to the client and then rendered by the client. This is in contrast to the server first rendering the content and then sending the rendered content as typical display data using the remote display protocol. In multimedia redirection, because the content is sent in its raw (or un-rendered) format, when the original data stream is highly compressed, less bandwidth is required to transfer the content. Also, transferring the rendering of the content to the client reduces the load on the server.

One ideal example of performing multimedia redirection is when the client-side application implements a remote display protocol (e.g., Microsoft's Remote Desktop Protocol, Citrix's ICA protocol, or another similar protocol). In particular, to perform multimedia redirection, the server and the client-side application utilize a virtual channel over which the multimedia content can be transferred. This virtual channel is established and maintained using the remote display protocol. Hereinafter, the client-side application that implements a remote display protocol to perform multimedia redirection will be referred to as a "remote display client."

Native Client is a technology for running native complied code in a browser. For example, Native Client can allow an application written in C or C++ to be compiled, linked, targeted, and executed within the browser environment. To enable this, Native Client includes a toolchain (i.e., a compiler, a linker, an assembler, etc.) that are used to convert native source code into a module that can be executed within the browser. The Native Client toolchain can produce non-portable modules (referred to as nexe modules) which are architecture dependent or portable modules (referred to as PNaCl or pexe modules) which are not.

Native Client executes these modules in a sandbox, or in other words, within an environment that limits access to system resources through a limited set of APIs. With Native Client, a remote display client can be developed using native code and run within the browser. In such cases, the remote display client could be configured to employ the limited set of APIs of the sandboxed environment to implement multimedia redirection. However, these APIs may not provide a satisfactory level of functionality to enable the rendering of multimedia content in an efficient manner.

BRIEF SUMMARY

The present invention extends to methods, systems, and computer program products for efficiently performing multimedia redirection in a Native Client module. More particularly, the present invention is directed to a Native Client-based remote display client that includes or is associated with a service that is configured to provide access to un-rendered multimedia content so that a process executing outside the Native Client sandbox, such as a browser, can retrieve the un-rendered multimedia content and render it outside the sandbox. In particular embodiments, the remote display client can obtain this un-rendered multimedia content over a virtual channel of a remote display protocol. However, this un-rendered multimedia content could also be obtained over any other type of connection with any host using any type of protocol. By using a service to make the un-rendered multimedia content accessible to a process executed outside the sandbox, a remote display client implemented as a Native Client module will not be limited to using the APIs available within the sandbox to render the multimedia content.

In one embodiment, the present invention is implemented as a method, performed by a remote display client that includes a Native Client module that is executed within the browser within a sandbox and browser code that is executed outside the sandbox, for redirecting multimedia content from the Native Client module for rendering outside the sandbox. The Native Client module obtains un-rendered multimedia content and causes the un-rendered multimedia content to be accessible via a web-based request. The Native Client module communicates parameters for generating a web-based request to access the un-rendered multimedia content to the browser code. Based on the parameters, the browser code generates browser instructions that when executed cause the web-based request to be sent to the Native Client module. In response to receiving the web-based request, the Native Client module sends the un-rendered multimedia content via a web-based communication pathway such that the un-rendered multimedia content can be rendered by the browser outside the sandbox.

In another embodiment, the present invention is implemented as one or more computer storage media storing computer executable instructions defining: a remote display client that includes a Native Client module that is configured to be executed by a browser within a sandbox; and browser code that is configured to be executed by the browser outside the sandbox. The remote display client, when executed within the browser, is configured to perform a method for redirecting multimedia content from the Native Client module to the browser code to allow the browser code to render the multimedia content outside the sandbox, the method includes: (1) establishing, by the Native Client module, a virtual channel with a remote display server; (2) receiving, by a service of the Native Client module, un-rendered multimedia content over the virtual channel; (3) listening, by the service and on a local port, for web-based requests for the un-rendered multimedia content; (4) communicating, by the service and to the browser code, parameters for constructing a web-based request to obtain the un-rendered multimedia content; (5) based on the parameters, generating, by the browser code, an HTML element that when executed will cause the web-based request to be sent to the local port on which the service is listening; and (6) in response to receiving the web-based request via the local port, sending, by the service, the un-rendered multimedia content in one or more web-based communications such that the un-rendered multimedia content will be rendered by the browser outside the sandbox in accordance with the conventions of the HTML element.

In another embodiment, the present invention is implemented as a method, performed by a remote display client that includes a Native Client module that is executed by a browser within a sandbox and browser code that is executed by the browser outside the sandbox, for redirecting multimedia content from the Native Client module to the browser code to allow the browser code to render the multimedia content outside the sandbox. The Native Client module obtains un-rendered multimedia content and listens on a local port for web-based requests for the un-rendered multimedia content. The Native Client module also communicates the local port and a path the multimedia content to the browser code. The browser code generates additional browser code that defines a URL that includes localhost, the local port and the path, and that when executed causes a web-based request to be sent to the URL. In response to receiving the web-based request, the Native Client module sends the un-rendered multimedia content via one or more web-based communications thereby causing the browser to render the multimedia content outside the sandbox.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 5A provides a representation of how the service of the Native Client module can communicate parameters to JavaScript code included within the remote display client to allow the JavaScript code to create appropriate code to cause a web-based request to be sent to the service to obtain the un-rendered multimedia content;

FIG. 5B provides a representation of how a nested browsing context launched in response to receiving the parameters from the Native Client module can send a web-based request to the service to obtain the un-rendered multimedia content.

DETAILED DESCRIPTION

In this specification, the term "remote display server" will be employed to generally refer to services that are provided on a server to enable remote access. Microsoft's Remote Desktop Services (or Terminal Services) is an example of such services; however, the present invention should not be limited to embodiments that employ Remote Desktop Services. For example, the term remote display server should be construed to encompass remote access services provided by Citrix or other providers. The term "remote display protocol" will be used to refer to the application layer protocol or protocols used by the remote display server and the remote display client to communicate. As an example, a remote display protocol includes Microsoft's Remote Desktop Protocol ("RDP") and Citrix's Independent Computing Architecture ("ICA") among possibly many others. Also, although this specification will describe the invention with reference to Google Chrome's Native Client, the invention can equally be implemented with any other browser-based sandbox that enables an application written in native code to be executed within the browser.

The term "multimedia content" should be construed as including any type of audio and/or video content. The term "render" should be construed as encompassing any function that is employed to convert multimedia content into a displayable format. Un-rendered multimedia content can therefore refer to multimedia content that is in a format that requires rendering before the multimedia content can be output. For example, un-rendered multimedia content can include content in a format supported by the HTML5 <video> tag or <audio> tag.

As indicated above, multimedia redirection is a remote access feature that can be provided using a virtual channel within a main channel of a remote display protocol connection. Accordingly, a Native Client-based remote display client can be configured to create and maintain a main channel and any number of virtual channels, including one for performing multimedia redirection, for communicating with a remote display server.

Figure 1:
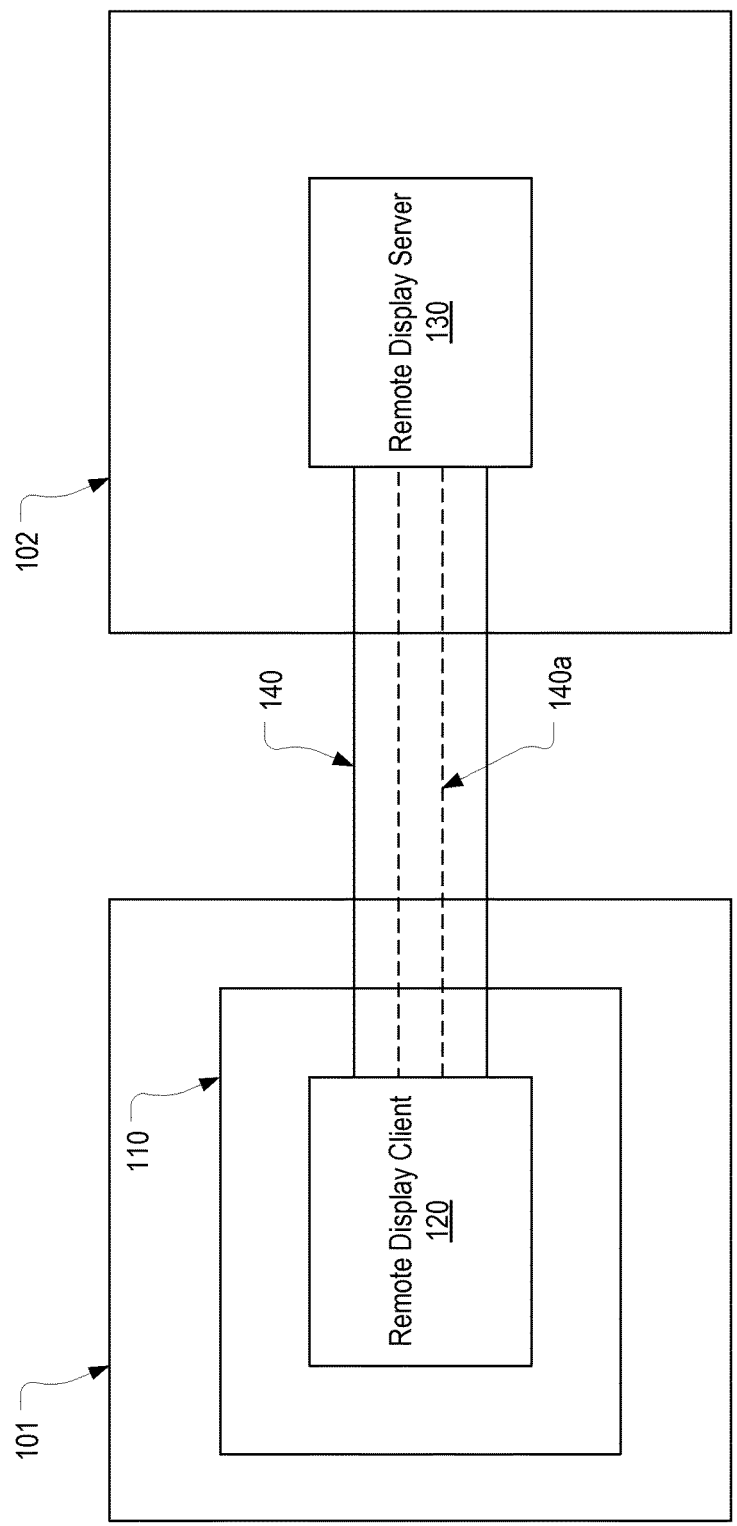
FIG. 1 provides a representation of an example computing environment in which a Native Client-based remote display client establishes a virtual channel with a remote display server.

FIG. 1 provides a general overview of how a virtual channel for performing multimedia redirection can be created. As shown, a client computing device 101 can include a browser 110 within which a Native Client-based remote display client 120 is executed. A server 102 can execute a remote display server 130 which establishes a main channel 140 and a virtual channel 140a using techniques of the remote display protocol employed by remote display server 130. As one of skill in the art understands how to establish main channel 140 and virtual channel 140a, no further description will be provided herein. Suffice it to say that during the establishment of virtual channel 140a, remote display client 120 notifies remote display server 130 of an endpoint (or listener) that is designated to receive data transferred over virtual channel 140a. Remote display server 130 can use an identifier of this endpoint to direct virtual channel data, which in this case is un-rendered multimedia content, to the endpoint.

Figure 2:
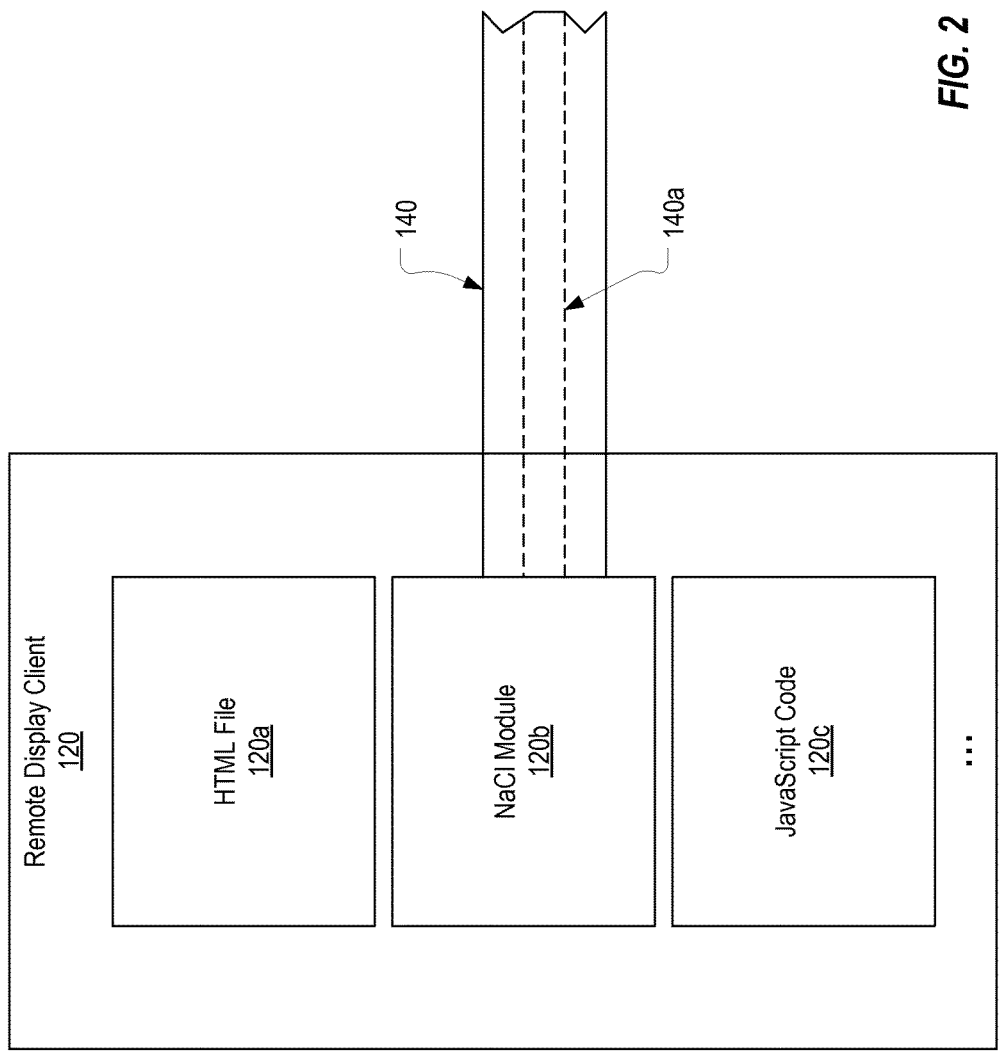
FIG. 2 provides a representation of example components of a Native Client-based remote display client.

FIG. 2 provides a more detailed view of the structure of remote display client 120. Because remote display client 120 is a Native Client-based application, it includes an HTML file 120a, a NaCl module 120b, and JavaScript Code 120c. JavaScript Code 120c can be part of HTML file 120a or can be defined separately within one or more .js files as is known in the art. As indicated by the ellipsis, remote display client 120 can include other components such as, for example, a Native Client manifest file CSS styles, etc. Native Client code may be loaded and installed at any time without regard to operation. Albeit the descriptions for installation exist within HTML code and manifest files, these are for the purpose of loading code into browser and establishing runtime information for the application's execution with the browser itself. For purposes of the claims, the term "Native Client module" can encompass the portion of remote display client 120 that is executed within the sandbox (e.g., NaCl module 120b) while the term "browser code" can encompass the portion of remote display client 120 that is not executed within the sandbox (e.g., HTML file 120a, JavaScript Code 120c, and any additional HTML or JavaScript code that they may generate in response to communicating with NaCl module 120b).

NaCl module 120b includes the code for implementing the core functionality of the remote display client. More particularly, NaCl module 120b provides the functionality for communicating with remote display server 130 using a remote display protocol. Accordingly, FIG. 2 shows that main channel 140 and virtual channel 140a are established with NaCl Module 120b.

Figure 3:
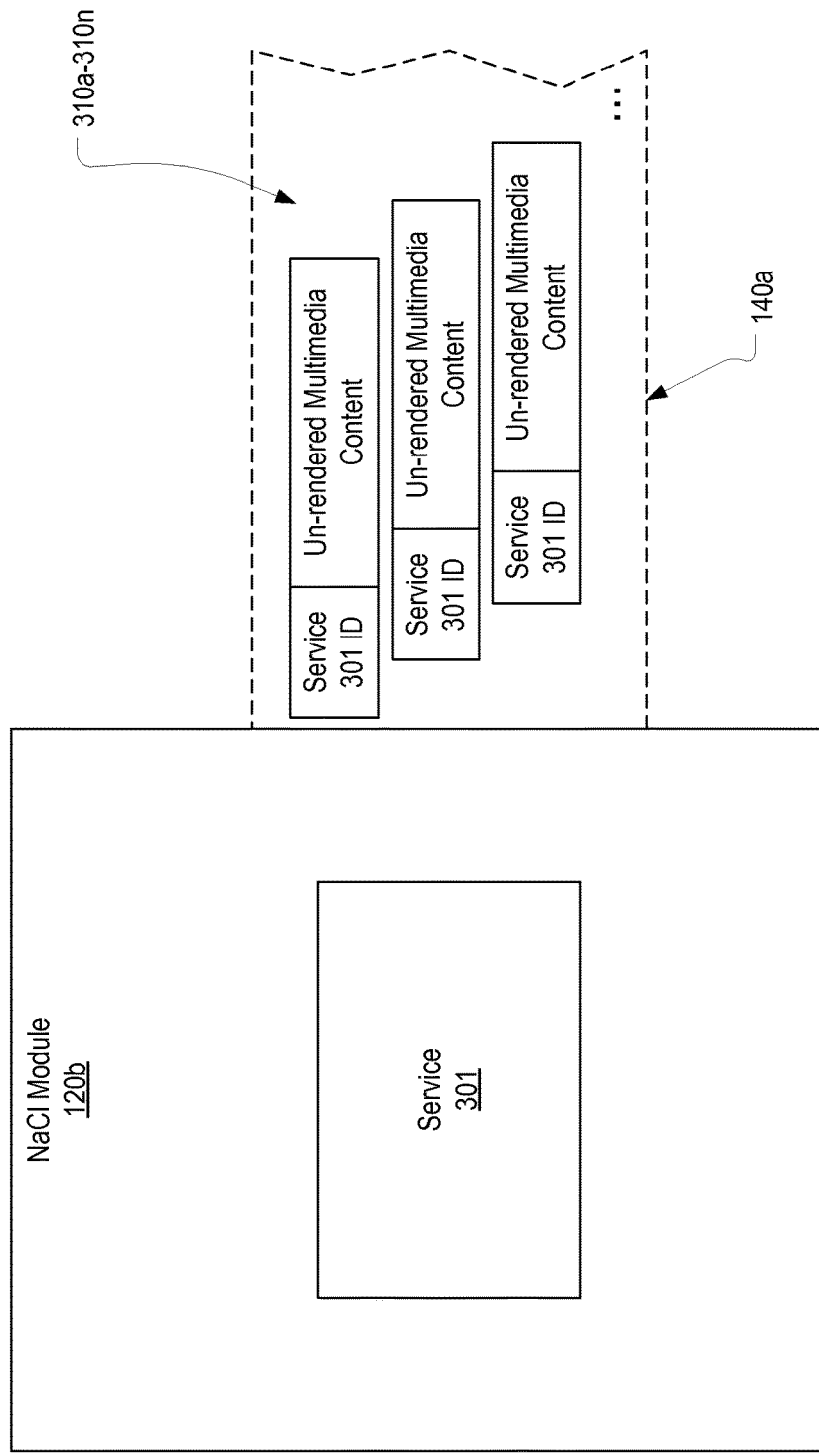
FIG. 3 provides a representation of a Native Client module that is configured to receive un-rendered multimedia content over a virtual channel for purposes of performing multimedia redirection with a remote display server.

As indicated above, packets may be transmitted over a virtual channel by virtue of the packets including an identifier of the endpoint for that virtual channel. In other words, all data transferred between remote display server 130 and remote display client 120 is transferred over main channel 140. However, to designate that a packet is part of a virtual channel, the packet can include the identifier of the designated endpoint for that virtual channel. FIG. 3 represents an example of this. As shown, a number of packets 310a-310n, each of which includes un-rendered multimedia content in its payload, is transmitted over virtual channel 140a. In this example, it will be assumed that remote display client 120 has specified that service 301 will be the endpoint for virtual channel 140a. Service 301 can therefore generally represent the portion of remote display client 120 that is configured to implement MMR within remote display client 120. Each of packets 310a-310n therefore includes an identifier of service 301 to ensure that the packets are routed through the service 301.

Although FIGS. 2-3 are described as representing an example where service 301 receives the un-rendered multimedia content over a virtual channel of a remote display protocol connection, the present invention can also be implemented when service 301 receives un-rendered multimedia content over any other type of connection and/or from any other server/host. For example, service 301 could be configured to receive un-rendered multimedia content from a different server and/or by using a different protocol (e.g., HTTP, WebSocket, etc.) or could be configured to obtain un-rendered multimedia content from a local source (e.g., using the file system Native Client APIs). Accordingly, although one preferred embodiment of the present invention includes receiving un-rendered multimedia content over a virtual channel, the present invention should extend to any embodiment where a service executed as part of a NaCl module obtains un-rendered multimedia content.

As mentioned in the background, NaCl module 120b is executed in a sandbox that provides limited APIs for accessing the underlying system's functionality. These APIs do provide a way for service 301 to render the multimedia content, or in other words, service 301 could be configured to employ the limited APIs to render the multimedia content within the sandboxed environment. However, in accordance with embodiments of the present invention, service 301 can be configured to make the un-rendered multimedia content accessible to a process that is executed outside the sandbox so that the multimedia content can be rendered by the process outside the sandbox. In some embodiments, this process can be a nested browsing context launched by JavaScript Code 120c as will be further described below.

Figure 4:
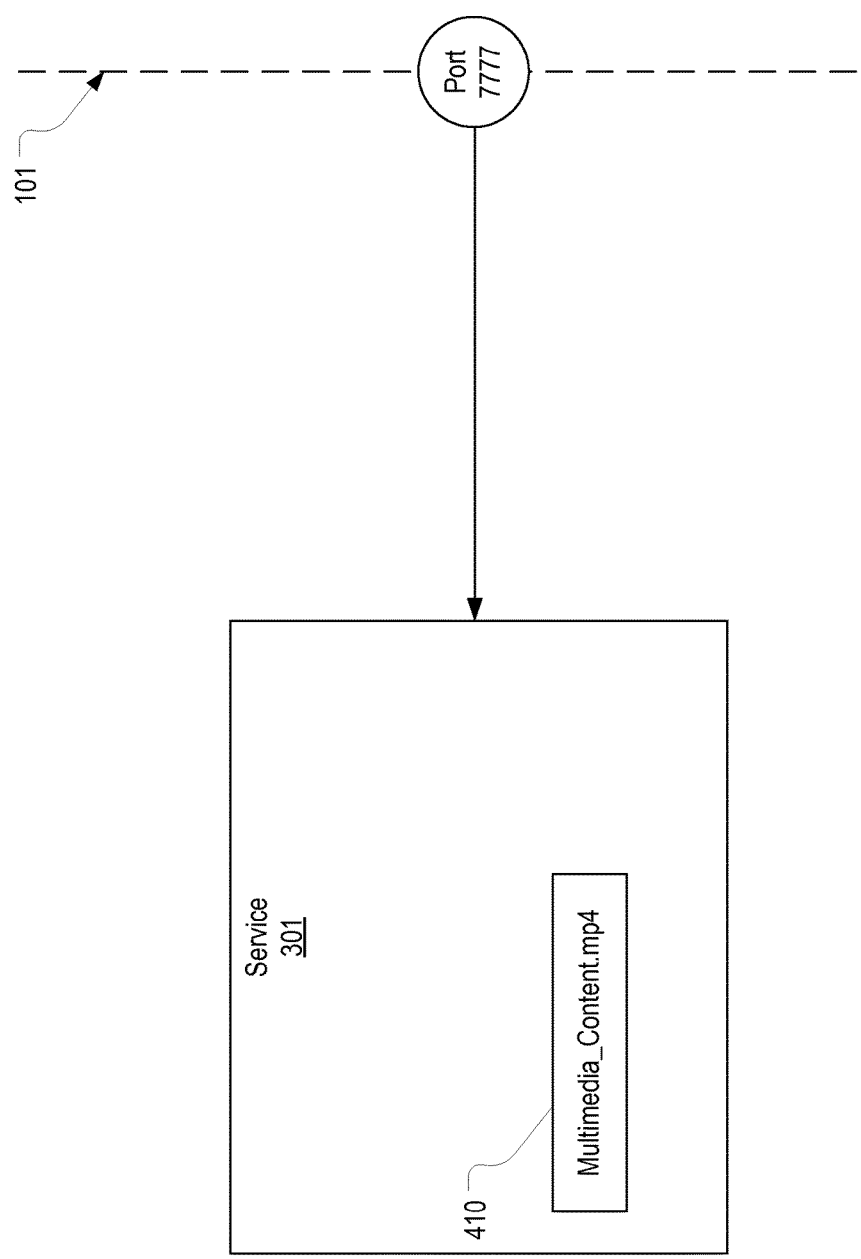
FIG. 4 provides a representation of how a service of the Native Client module can listen on a local port for web-based requests for the un-rendered multimedia content.

FIG. 4 illustrates an example of how service 301 can make the un-rendered multimedia content accessible to a process executing outside the sandbox. As a general overview, once service 301 obtains un-rendered multimedia content (whether via virtual channel 140a or otherwise), service 301 can function like a server to make the un-rendered multimedia content accessible using typical web-access techniques. In particular, service 301 can listen on a local port for incoming requests for the un-rendered multimedia content, and, in response to such requests, can transmit the un-rendered multimedia content to the requesting process using typical internet communications (e.g., HTTP communications). The requesting process, which would be executing outside the sandbox, can then render the multimedia content.

As shown in FIG. 4, service 301 has received/obtained the un-rendered multimedia content which in this example is an .mp4. For purposes of illustration, it will be assumed that service 301 has temporarily stored the multimedia content as "Multimedia_Content.mp4" in a manner that would allow the .mp4 file to be requested using a web-based request (e.g., an HTTP get request). The particular manner in which the .mp4 file is made accessible in not essential to the invention and any known technique for serving the .mp4 file (or any other type of multimedia file/format) could be used. FIG. 4 also represents that service 301 has commenced listening for incoming requests on a local port which in this case is assumed to be port 7777. In summary, in response to obtaining/receiving un-rendered multimedia content, service 301 can be configured to function as a server for enabling a process outside the sandbox to access the multimedia content.

In addition to making the un-rendered multimedia content accessible via a web-based request, service 301 can also communicate with a process within remote display client 120 that is executing outside the sandbox to provide parameters necessary for the process to submit an appropriate request to obtain the multimedia content. In a particular embodiment, service 301 can communicate with JavaScript code 120c to provide JavaScript code 120c with the appropriate parameters. These parameters can include the name of the multimedia file (e.g., "Multimedia_Content.mp4", the name of an unbound stream, the name of a webrtc connection, etc.), any additional path information to the multimedia file, a type of the multimedia content (e.g., .mp4), the port that service 301 is listening on (e.g., port 7777), the protocol to use to submit the request (e.g., HTTP, WebSocket, etc.), dimensions for the multimedia content (e.g., width=520, height=292), and any other parameters that may be needed to allow the process to submit a request to obtain the multimedia content.

In some embodiments, as represented in FIG. 5A, service 301 can employ Native Client's messaging system (e.g., by employing the PostMessage function of the Pepper API) to communicate parameters 501 to the appropriate portion of JavaScript Code 120c. This portion of JavaScript Code 120c can then generate appropriate code to cause the request to be submitted. In some embodiments, this can be accomplished by creating an HTML5 <video> element within an <iframe> where the <video> element is configured in accordance with the parameters provided by service 301. As an example, JavaScript Code 120c can cause a nested browsing context to be launched (via the <iframe> element) which includes the following simplified HTML code:

```
<video width="520" height="292"
    src="wss://localhost:7777/hash/multimedia_content.mp4">
</video>
```

As shown in this code, because JavaScript Code 120c and service 301 are both executed on client computing device 101, the request can include localhost in place of the domain name or IP address that would typically be sourced as an HTTP request or websocket connection. Localhost refers to "this computer." Therefore, from client computing device 101's perspective, the request will be sent to itself. Hash would be a pathway to the specific virtual channel being mapped through the service. Accordingly, when the nested browsing context 510 containing this <video> element is executed, an HTTP request 520 will be sent via localhost to port 7777 to request "multimedia_content.mp4" as represented in FIG. 5B. Upon receiving request 520, service 301 will respond by sending the multimedia content to the nested browsing context (via localhost and whatever source port was used to send request 520). Given that nested browsing context 510 is obtaining the multimedia content using standard HTML techniques (i.e., using the <video> element), the multimedia content will be automatically rendered in nested browsing context 510 outside the sandbox using the standard browser conventions. It is noted that the code above is intended to be a simplified example. Any type of multimedia content, any protocol for transferring it, and any parameters for rendering it can be employed. As an additional non-limiting example, service 301 could make the multimedia content accessible using the M3U file format which can be used to stream the multimedia content.

In summary, a remote display client can be written in native code without being limited to employing the sandbox APIs to perform multimedia redirection. Given that some browsers execute a nested browsing context on a separate thread, the rendering of the multimedia content can be performed in a manner that is largely independent of the execution of the remote display client. This can allow the remote display client to perform its standard remote access functions (e.g., displaying a remote desktop and communicating user input data) in a more efficient manner.

Figure 6:
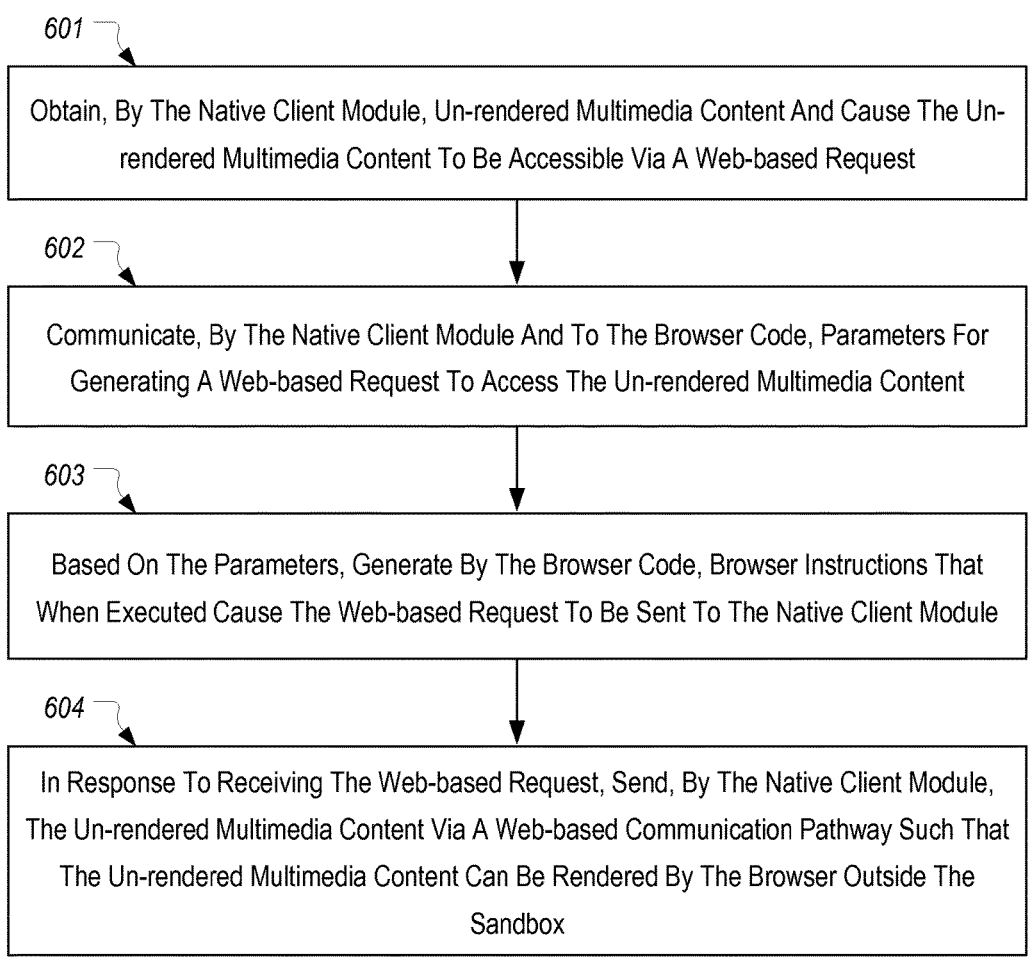
FIG. 6 provides a flowchart of an example method for redirecting multimedia content from the Native Client module to the browser code to allow the browser code to render the multimedia content outside the sandbox.

FIG. 6 provides a flowchart of an example method 600 for redirecting multimedia content from the Native Client module to the browser code to allow the browser code to render the multimedia content outside the sandbox. Method 600 can be performed by a remote display client that includes a Native Client module that is executed by a browser within a sandbox and browser code that is executed by the browser outside the sandbox, and will be described with reference to FIG. 1-5B.

Method 600 includes an act 601 of obtaining, by the Native Client module, un-rendered multimedia content and causing the un-rendered multimedia content to be accessible via a web-based request. For example, NaCl module 120*b* (or service 301 of NaCl module 120*b*) can receive un-rendered multimedia content via virtual channel 140*a*, via a channel with another server/host, via access to a local file system, etc., can format/store the un-rendered multimedia content in a manner that will allow it to be served in response to web-based requests, and can listen for such web-based requests on a local port.

Method 600 includes an act 602 of communicating, by the Native Client module and to the browser code, parameters for generating a web-based request to access the un-rendered multimedia content. For example, Native Client module 120*b* (or service 301 of NaCl module 120*b*) can communicate any parameters that JavaScript code may need to generate the appropriate code (e.g., a video element) to cause a web-based request to be sent to obtain the un-rendered multimedia content.

Method 600 includes an act 603 of generating, by the browser code and based on the parameters, additional browser code that when executed will cause the web-based request to be sent to the Native Client module. For example, JavaScript code 120*c* can generate a video element or other similar element which when executed by the browser causes an appropriate HTTP or other similar request to be sent to obtain the un-rendered multimedia content.

Method 600 includes an act 604 of, in response to receiving the web-based request, sending, by the Native Client module, the un-rendered multimedia content to the additional browser code via one or more web-based communications such that the additional browser code can cause the un-rendered multimedia content to be rendered by the browser outside the sandbox. For example, NaCl module 120*b* (or service 301 of NaCl module 120*b*) can send one or more HTTP or other similar communications to the browser to allow the browser to render the multimedia content outside of the sandbox using its standard conventions (e.g., the conventions employed when multimedia is obtained using a video element).

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a remote display client that includes a Native Client module that is executed within a browser within a sandbox and browser code that is executed outside the sandbox, for redirecting un-rendered multimedia content from the Native Client module for rendering outside the sandbox, the method comprising:
   obtaining, by the Native Client module, un-rendered multimedia content and causing the un-rendered multimedia content to be accessible via a web-based request;
   communicating, by the Native Client module and to the browser code, parameters for generating a web-based request to access the un-rendered multimedia content;
   based on the parameters, generating, by the browser code, browser instructions that when executed cause the web-based request to be sent to the Native Client module;
   in response to receiving the web-based request, sending, by the Native Client module, the un-rendered multimedia content via a web-based communication pathway thereby causing the un-rendered multimedia content to be rendered by the browser outside the sandbox.

2. The method of claim 1, wherein the un-rendered multimedia content is obtained via a virtual channel that the established between the Native Client module and a remote display server.

3. The method of claim 1, wherein causing the un-rendered multimedia content to be accessible via a web-based request comprises causing a service of the Native Client module to listen for web-based requests on a local port.

4. The method of claim 3, wherein the service is also configured to function as an endpoint of a virtual channel over which the un-rendered multimedia content is received.

5. The method of claim 1, wherein the parameters comprise one or more of:
   a local port on which a service of the Native Client module is listening for web-based requests;
   a path to the multimedia content;
   a filename of the multimedia content;
   a protocol to use to send the web-based request;
   one or more dimensions of the multimedia content; or
   a type of the multimedia content.

6. The method of claim 1, wherein communicating parameters comprises the Native Client module sending one or more messages containing the parameters to a JavaScript component of the browser code using a Native Client messaging system.

7. The method of claim 1, wherein generating browser instructions comprises generating Hypertext Markup Language (HTML) code that includes a video element having a source attribute or source element that defines a uniform resource locator (URL) generated based on the parameters.

8. The method of claim 7, wherein the URL includes a local port that was included in the parameters.

9. The method of claim 8, wherein the URL includes localhost.

10. The method of claim 9, wherein the URL includes a filename of the multimedia content that was included in the parameters.

11. The method of claim 10, wherein the URL includes one or more dimensions of the multimedia content that was included in the parameters.

12. The method of claim 7, wherein the video element is included within an iframe element.

13. The method of claim 1, wherein the browser instructions define a nested browsing context.

14. One or more computer storage media storing computer executable instructions defining a remote display client that includes a Native Client module that is configured to be executed by a browser within a sandbox and browser code that is configured to be executed by the browser outside the sandbox, the remote display client when executed within the browser being configured to perform a method for redirecting multimedia content from the Native Client module to the browser code to allow the browser code to render the multimedia content outside the sandbox, the method comprising:
   establishing, by the Native Client module, a virtual channel with a remote display server;
   receiving, by a service of the Native Client module, un-rendered multimedia content over the virtual channel;
   listening, by the service and on a local port, for web-based requests for the un-rendered multimedia content;
   communicating, by the service and to the browser code, parameters for constructing a web-based request to obtain the un-rendered multimedia content;
   based on the parameters, generating, by the browser code, a Hypertext Markup Language (HTML) element that when executed will cause the web-based request to be sent to the local port on which the service is listening; and
   in response to receiving the web-based request via the local port, sending, by the service, the un-rendered multimedia content in one or more web-based communications thereby causing the un-rendered multimedia content to be rendered by the browser outside the sandbox in accordance with the conventions of the HTML element.

15. The computer storage media of claim 14, wherein the HTML element is a video element.

16. The computer storage media of claim 15, wherein the video element is generated within a nested browsing context.

17. The computer storage media of claim 14, wherein the parameters include the local port and a path to the multimedia content.

18. The computer storage media of claim 14, wherein the web-based request is a Hypertext Transfer Protocol (HTTP) request.

19. A method, performed by a remote display client that includes a Native Client module that is executed by a browser within a sandbox and browser code that is executed by the browser outside the sandbox, for redirecting multimedia content from the Native Client module to the browser code to allow the browser code to render the multimedia content outside the sandbox, the method comprising:
   obtaining, by the Native Client module, un-rendered multimedia content;
   listening, by the Native Client module and on a local port, for web-based requests for the un-rendered multimedia content;
   communicating, by the Native Client module and to the browser code, the local port and a path the multimedia content;

generating, by the browser code, additional browser code that defines a uniform resource locator (URL) that includes localhost, the local port and the path, and that when executed causes a web-based request to be sent to the URL;

in response to receiving the web-based request, sending, by the Native Client module, the un-rendered multimedia content via one or more web-based communications thereby causing the browser to render the multimedia content outside the sandbox.

20. The method of claim 19, wherein the additional browser code comprises a Hypertext Markup Language (HTML) video element that is included within an iframe element.

* * * * *